United States Patent [19]
Bice et al.

[11] 4,120,970
[45] Oct. 17, 1978

[54] COMPOSITION FOR PREVENTING DECAY OF FRUIT AND INHIBITING SPORULATION THEREON

[75] Inventors: John R. Bice; Philip J. Lewis, both of Corona, Calif.

[73] Assignee: Brogdex Company, Pomona, Calif.

[21] Appl. No.: 428,930

[22] Filed: Dec. 27, 1973

Related U.S. Application Data

[63] Continuation of Ser. No. 253,195, May 15, 1972, abandoned, which is a continuation-in-part of Ser. No. 53,996, Jul. 10, 1970, Pat. No. 3,674,510.

[51] Int. Cl.$^2$ ............................................... A23L 3/34
[52] U.S. Cl. ................................ 424/270; 424/346; 426/333; 426/335
[58] Field of Search ............................. 426/204–206, 426/227, 151, 308, 310, 331, 333, 335, 372; 424/270, 346

[56] References Cited

U.S. PATENT DOCUMENTS 3,370,957  2/1968  Wagner ............................... 426/157

OTHER PUBLICATIONS

*Chem. Abstracts* vol. 65, (1966) p. 17596b.
*Chem. Abstracts* vol. 65, (1966) p. 11266e.
*Chem. Abstracts* vol. 65, (1966) p. 20754g.

*Primary Examiner*—Norman Yudkoff
*Attorney, Agent, or Firm*—Poms, Smith, Lande & Glenny

[57] ABSTRACT

A composition for simultaneously controlling molds and fungi, which cause decay of fruit, and inhibiting sporulation of said molds and fungi on said fruit, said composition containing 2-(4-thiazolyl) benzimidazole and an alkali metal salt of ortho-phenyl phenol tetrahydrate, the weight ratio in said composition of 2-(4-thiazolyl) benzimidazole to the alkali metal salt of ortho-phenyl phenol tetrahydrate (expressed as ortho-phenyl phenol) being 1:0.5-15.

5 Claims, No Drawings

COMPOSITION FOR PREVENTING DECAY OF FRUIT AND INHIBITING SPORULATION THEREON

CROSS-REFERENCE TO RELATED APPLICATIONS

This is a continuation, of application Ser. No. 253,195, filed May 15, 1972, now abandoned; which is a continuation-in-part application of our co-pending application Ser. No. 53,996, filed July 10, 1970, now U.S. Pat. No. 3,674,510.

BACKGROUND OF THE INVENTION

All fruit, after they have been harvested, are subject to attack by organisms such as molds or fungi which cause decay of the picked fruit. Decay of fresh fruit is a serious problem and causes losses in the millions of dollars.

In addition to decay of fresh fruit there is a problem of the sporulation of molds and fungi which are growing on the fruit. Molds and fungi will attack and cause decay of the specific fruit which they are in contact with, and if they sporulate the molds and fungi spoil adjacent fruit and render them unsellable.

In the past, generally one compound was applied to the fruit in order to prevent decay of the fruit due to molds and fungi and another compound applied to the surface of the fruit in order to prevent or inhibit sporulation of said molds and fungi. It is self-evident that utilizing two separate operations to prevent decay and sporulation is uneconomical and, in addition, the most prevalent compound (biphenyl) utilized in preventing sporulation of fruit has many objectionable disadvantages, such as the very strong odor found on fruit treated with biphenyl.

It has therefore long been a desideratum in the art to discover a composition of matter which could replace biphenyl as a sporulation inhibitor and also to develop a composition of matter which could both prevent decay on fresh fruit and inhibit sporulation of molds and fungi growing on such fruit.

SUMMARY OF THE INVENTION

We have discovered that compositions of matter containing 2-(4-thiazolyl) benzimidazole (hereinafter TBZ) and an alkali metal salt of ortho-phenyl phenol tetrahydrate (hereinafter AOPP), in certain amounts, is effective in simultaneously controlling or inhibiting molds and fungi which cause decay in fruits and inhibiting sporulation of said molds and fungi, without adverse side affects. The compositions of this invention are particularly effective on citrus fruit such as lemons, oranges and grapefruit but are also effective on other fruit such as apples, peaches, etc.

Both TBZ and AOPP, which are the active ingredients of the compositions of this invention, have been utilized heretofore in preventing decay of fruit. The Food and Drug Administration has approved the use of these two compounds for preventing decay of fruit and inhibiting sporulation thereon. Previously, the Food and Drug Administration had only approved the use of TBZ if the TBZ residue left on the fruit did not exceed two parts per million by weight. However, it is now apparent that the Food and Drug Administration will approve an increase in the amount of TBZ residue left on the fruit. The maximal amount which will be approved by the FDA will probably be 10 parts per million. Therefore, the present invention contemplates utilizing compositions wherein the amount of TBZ residue on the fruit will be maximally about 10 parts per million but preferably about 5 parts per million since we have found that 5 parts per million of TBZ on the fruit adequately protects the fruit from sporulation if in combination with AOPP.

At the present time the maximum amount of AOPP (expressed as ortho-phenyl phenol, hereinafter OPP), approved by FDA, which may be left on the fruit is 10 parts per million. The reason for this limitation on the maximum amount of OPP is because, heretofore it was thought that more than 10 parts per million of OPP would burn the fruit. However, we have found that 15 parts per million of OPP can be applied to the fruit without burning. Therefore, this invention contemplates utilizing from 5 to 15 parts per million of OP when FDA approves such amounts. Until then the preferred range is from 5 to 10 parts per million of OPP.

Since neither TBZ nor AOPP, in the dosages indicated, adversely effect the appearance of color of the fruit and do not have objectionable odors it would be desirable if these compounds could replace biphenyl and the other objectionable compounds utilized in preventing sporulation of molds and fungi growing on the fruit. However, when TBZ and AOPP are utilized in the indicated dosages neither compound used by itself will inhibit sporulation of molds and fungi to any significant extent.

It is, therefore, an object of this invention to provide new and useful compositions of matter which control or inhibit molds and fungi which cause decay of fresh fruit.

Another object of this invention is to provide and embody a composition for simultaneously controlling molds and fungi which cause decay of fresh fruit and inhibiting the sporulation of such molds and fungi in order to prevent soiling of adjacent fruit.

Another and still further object of this invention is to disclose and provide compositions of matter containing TBZ and AOPP, the weight ratio of TBZ and AOPP (expressed as OPP) being from 1:0.5–15 with the preferred range being 1:0.5–10, and the more preferred range being 1:1–10.

Still another object of this invention is to provide a composition of matter possessing fungistatic properties which can be applied to fruit in wax formulations and which obviate the necessity of subjecting the fruit to a subsequent step in order to prevent sporulation of molds and fungi.

These and other objects will be readily apparent by reference to the following discussion and claims.

DESCRIPTION OF THE PREFERRED EMBODIMENTS

The present invention is predicated on the surprising discovery that a synergistic result is obtained by applying both TBZ and AOPP in a weight ratio in which the TBZ residue on the fruit is between 1 to 10 parts per million and the AOPP residue (expressed as OPP) is between 5 and 15 parts per million.

In our parent application the weight ratio of TBZ to OPP was stated as being between 1:2.5–10. This was based on the fact that, at that time, the maximum amount of TBZ residue on the fruit allowed by FDA was 2 parts per million. The minimum amount of TBZ left on the fruit in order to get adequate sporulation control was 1 part per million. Also, at the time the previous application was filed, it was felt that the maximum amount of OPP residue on the fruit was 10 parts per million because more than that would cause burning of the fruit. We had also discovered that the preferred minimum amount of OPP left on the fruit should be about 5 parts per million. This was the reason for the weight ratio expressed in the previously filed application and this weight ratio is still applicable if only 2 parts per million of TBZ residue is left on the fruit.

However, as noted above, the FDA probably will shortly raise the maximum amount of TBZ which can be left on the fruit to 6, 8 or 10 parts per million. Additionally, we have discovered that the residue of OPP on the fruit can be raised to around 15 parts per million without burning the fruit although it is still preferred to utilize 10 parts per million or less since this is the maximum amount now allowed by the FDA. The minimum amount of OPP left on the fruit is still contemplated as being 5 parts per million.

The maximum amount of TBZ left on the fruit as contemplated by the present invention is 10 parts per million and the minimum amount of TBZ which is left on the fruit is 1 part per million. However, it is believed that in order to adequately contorol sporulation it is only necessary to have a maximum residue of TBZ left on the fruit of around 5 parts per million and, possibly, around 4 or 3 parts per million. However, it should be noted, that if oranges are the fruit to be treated, then 2 parts per million of TBZ residue is sufficient to have 90% or greater sporulation control providing, of course, that it is in combination with OPP, the amount of OPP being 5 parts per million or greater, e.g. from 5 to 10 parts per million.

In the case of lemons, we have found that about 9 parts per million of TBZ residue left on the fruit will only control sporulation about 55% whereas a combination of TBZ and OPP (the concentration of TBZ ranging from 3 to 4 parts per million) will control sporulation about 75%. Thus, in the case of lemons, it is deemed desirable to utilize TBZ in greater amounts than 2 parts per million.

TBZ is not water-soluble to any significant extent and therefore when utilized in an aqueous composition it is preferred to have a dispersion thereof. However, since TBZ is soluble in a number of organic solvents the use of such solvents are not excluded and it is contemplated that the solvent can be miscible in water thereby having a solution of TBZ and AOPP. But, it should be emphasized that AOPP and TBZ can be applied directly to the fruit as a solution, suspension, dispersion, foam or any other manner. If the TBZ and AOPP is applied directly to the fruit in the amounts specified such treatment will inhibit organisms which cause decay and concurrently prevent formation of spores on the surface of any decayed fruit thereby preventing soilage of adjacent sound fruit by the spores.

The particular amount of TBZ and AOPP in the composition is not at all critical providing, of course, that the weight ratio is correct so that the correct residue is left on the fruit. Inasmuch as relatively small amounts of both TBZ and AOPP should remain on the fruit it is generally preferred if relatively small amounts are in the composition applied to the fruit; the TBZ and AOPP can be dilluted in some convenient manner so that the amount of composition put on the fruit will not be as critical. It is obvious if the TBZ and AOPP were applied undilluted the precise amount applied would be critical and there would be little room for error. However, if the AOPP and TBZ are dilluted then the precise amount of composition put on the fruit is not as critical. Generally speaking, the amunt of AOPP (OPP) will range from 1% by weight to as high as 10 or 20% by weight, based on the weight of the entire composition with the preferred range being from say 2% to 5%, by weight. The amount of TBZ is similarly not critical but, again, it is preferred that it be utilized in amounts less than about 20% by weight. For example, the amount of TBZ in the composition can range from as little as 10 parts per million (0.01%) to as high as 20% but it is preferred, if the range of TBZ is from 0.3% to 5% or 10%, by weight based on the entire weight of the composition.

As noted above, AOPP is soluble water and therefore it is preferred to utilize the TBZ and AOPP in an aqueous composition. If it is desired to also to have the TBZ in solution, it is easily accomplished by utilizing an organic solvent which is water miscible and in which the TBZ is soluble (e.g. dimethyl formamide as well as various alcohols and chlorinated hydrocarbons).

It is generally desirable to apply the TBZ-AOPP in compositions normally used in treating the fruit. For example, the AOPP and TBZ can be added to the foam normally used to wash the fruit, the TBZ being in dispersion and the AOPP being in solution. Additionally, the AOPP and TBZ can be applied in the so-called water eliminator rinse, which removes the foam from the fruit. However, it is generally preferred if the TBZ and AOPP are formulated with waxes, resins, or coloring material used to enhance the appearance, improve the gloss, or retard the shrinkage of the fruit in question. Thus, the AOPP and TBZ can be formulated with a wax formulation containing water having an emulsification or dispersion of wax therein. In this case the AOPP would be in solution while the TBZ would be in dispersion As has been noted before, a synergistic result is obtained by utilizing a composition containing TBZ and AOPP (expressed as OPP) if the weight ratio of the TBZ to AOPP is such that the weight ratio of TBZ to AOPP (expressed as OPP) on the fruit is 1:0.5–15. However, as noted, in order to adequately control decay and control sporulation of most fruit the weight ratio of TBZ to OPP on the fruit can be from 1:11 or 12 to 1:1. In other words, the amount of TBZ remaining on the fruit is from 1 to 3 or parts per million while the amount of OPP remaining on the fruit is from 5 to 11 or 12 parts per million. Exemplary of such fruit are oranges, lemons, and grapefruit. Oranges require the least amount of TBZ to adequately control sporulation, grapefruit are the next, and lemons require the greatest amount of TBZ. Thus, with lemons, it is preferred if the residue of TBZ left on the fruit is at least 3 parts per million and can range from 3 to 6 and as high as 10 parts per million. With respect to OPP the range can vary from as low as 5 parts per million with the preferred range being from about 7 to 11 or 12 parts per million.

It should be noted that in the following examples all parts are by weight unless expressly stated otherwise. In addition, the residue of AOPP is expressed in parts by weight based on the amount of ortho-phenol (OPP) rather than on the hydrated alkali metal form. The reason for this is because this is the manner in which the Food and Drug Administration sets a limit on the amount of residue permissible on the fruit and because the weight obviously depends upon the particular metal utilized and the amount of water combined in the basic compound. Therefore, in speaking of the residue of AOPP it will be understood that throughout the specification and claims the amount of AOPP is expressed as the amount of OPP left on the fruit. However, when speaking of the amount of AOPP in a particular composition, the amount is by weight based on the AOPP unless expressly indicated.

Salts of ortho-phenyl phenol which have proven particularly effective in the context of the present invention are the alkali metal salts such as potassium and sodium. The alkali metal salts are all water-soluble in the concentrations envisioned in this invention and therefore it is convenient to utilize these alkali metal salts in aqueous compositions so that the AOPP is in solution.

The following example is given to demonstrate the unusual and synergistic effect of the present invention when the composition of this invention is applied to oranges, utilizing TBZ in amounts of 2 parts per million or less on oranges. Additionally, the following example shows the convenience of adding TBZ and AOPP to fruit by incorporating them into a wax formulation normally used on fruit, said wax formulation having the following formula:

| Constituent | Amount (Pts. by Wt.) |
| --- | --- |
| water | 76 |
| protein | 1.3 |
| PW* | 17 |
| shellac | 3 |

PW* is a polyethyleneoxide wax composed 40 parts by weight of Epolene 45 (polyethylene oxide resin), 7 parts by weight of oleic acid and 5 parts by weight of morpholine.

From this wax was made three compositions; one composition containing the wax and 0.35 parts by weight of TBZ, a second composition containing about 2 parts by weight of SOPP and a third composition containing 2 parts by weight of SOPP and 0.35 parts by weight of TBZ.

Two hundred forty navel oranges were innoculated with *Pencillium digitatum* and the fruit divided into four separate groups containing 60 oranges each. To Group 1 was applied the wax formulations, to Group 2 was applied the wax formulation containing TBZ, to Group 3 was applied the wax formulation containing SOPP, and to Group 4 was applied the was formulation containing TBZ and SOPP. After the wax formulation had been applied to the fruit the fruit were stored for three weeks at between 45° and 50° F. and for one week at 65° to 75° F. At the end of four weeks the fruit were inspected for sporulation control and decay control and analyzed for the residue of SOPP and TBZ on the fruit. The results of these tests are given in the table below.

| Formulation | % Decay | %Sporulation Control | Residue of TBZ (PPM) | Residue of OPP (PPM) |
| --- | --- | --- | --- | --- |
| 1 | 49.5 | 0 | 0 | 0 |
| 2 | 7.1 | 25 | 1.5-2 | 0 |
| 3 | 25 | 0 | 0 | 5-7 |
| 4 | 8.6 | 90 | 1.5-2 | 5-7 |

In another example oranges were scratch innoculated with both *Penicillium italicum* and *Pencillium digitatum*. The fruit were divided into three substantially equal groups, and labeled Groups 1, 2, and 3. To the Group 1 oranges was applied the wax formulation given above, the Group 2 oranges were sprayed with water containing 0.125 parts of TBZ and thereafter there was applied the wax formulation containing 2 parts of AOPP, and to the Group 3 oranges was applied the wax formulation containing 0.35 parts of TBZ and 2 parts of AOPP. All three groups of oranges were stored at 56° F. and 95-100% humidity for eleven days. The fruit were then inspected and the following results obtained:

| Formulation | % Decay | % Sporulation Control | Residue of TBZ (PPM) | Residue of OPP (PPM) |
| --- | --- | --- | --- | --- |
| 1 | 31.25 | 5 | 0 | 0 |
| 2 | 3 | 20 | 0.4 | 6-7 |
| 3 | 3 | 97 | 1.8-2 | 6-7 |

There is no difference between Groups 2 and 3 in decay control but Group 3 gave 77% better sporulation control on decaying fruit.

As is apparent from the foregoing test, TBZ when utilized alone and at two parts per million had only a 25% sporulation control. When OPP was utilized alone at a concentration of 7 parts per million there was no sporulation control. However, when TBZ and OPP were utilized together in approximately the same amounts, there was a 90% sporulation control.

The following examples exemplify the present invention when greater amounts of TBZ and OOP are utilized (as compared with the foregoing examples) on lemons. The tests were conducted to demonstrate that a combination of OPP and TBZ could replace biphenyl as an inhibitor of sporulation. Biphenyl is the standard utilized by the industry and the test of whether or not a particular composition is an adequate sporulation inhibitor is whether or not it inhibits sporulation, as much, or more than biphenyl does.

In order to determine this, a number of lemons were taken from a feed line after they had been washed by a neutral cleaner.

One hundred sixty plus of the lemons were run through a waxer containing wax having the composition indicated in the preceeding example, i.e., the wax contains 76% water, 1.3% portein, 17% PW, and 3% shellac. To the wax composition, prior to it being placed on the lemons, was added a sufficient amount of TBZ to give a residue on the lemons of 8.3 parts per million of TBZ.

Another 160 plus lemons were run through the same wax except that the wax contained a sufficient amount of sodium OPP to leave a residue of 7 parts per million of OPP on the lemons. The wax also contained TBZ in an amount sufficient to leave 3.3 parts per million of TBZ on the lemon.

Another 240 plus lemons were run through the waxer, the wax contained a sufficient amount of sodium OPP to leave a residue on the fruit of 10.6 parts per millionn of OPP. The wax also contained a sufficient amount of TBZ to leave a residue on the fruit of 3.7 parts per million of TBZ.

Thereafter, all of the lemons were syringe innoculated with *Penicillium digitatum*. Other lemons which had been run through the waxer in which the wax had neither TBZ nor OPP added were packed into cartons. From each carton 20 fruit were removed and the carbon was repacked with 20 syringe innoculated fruit randomly distributed throughout the pack. Other lemons which were waxed with neither TBZ nor OPP were utilized as a control and other lemons with wax containing no TBZ nor OPP were selected and biphenyl treatment was applied to these lemons, the biphenyl being applied to two sheets per carton.

The fruit packed in the carton were taken to a laboratory and were held for 1 week at 56° F. and for 14 days at 52° F. The boxes were then opened and examined. In the following test, treatment No. 1 is the control in which 12 cartons of fruit were utilized, treatment 2 is the biphenyl treatment in which 12 cartons were utilized, treatment No. 3 are the lemons having 8.3 parts per million of TBZ (12 cartons were utilized) treatment 4 were lemons having 7 parts per million of OPP and 3.3 parts per million of TBZ (8 cartons were utilized) and treatment 5 were lemons having 10.6 parts per million of OPP and 3.7 parts per million of TBZ (8 cartons were utilized). The results of the tests are as follows:

| Treatment | % Soiled | % Sporulation Control |
|---|---|---|
| 1 | 62.9 | 0 |
| 2 | 34.35 | 61 |
| 3 | 39.44 | 47 |
| 4 | 24.23 | 67 |
| 5 | 24.25 | 68 |

In another test it was found that lemons having a residue of 6 to 7 parts per million of OPP which were innoculated with Penicillium, the OPP did not prevent sporulation. These lemons were stored at 58° F. for a period of about 2 weeks.

It is believed that the foregoing tests show that the combination of OPP and TBZ give sporulation control equal to or better than biphenyl and about 2½ times better than either TBZ alone or OPP alone. Adequate sporulation control was obtained when the TBZ residue was 3.3 parts per million and the OPP residue was 7 parts per million. Increasing the OPP residue does not seem to give any additional control of sporulation.

It will be understood that the foregoing description is only illustrative of the present invention and it is not to be limited thereto. Many other ways of applying the composition of this invention, other wax formulations, etc. will be apparent to the art skilled and all substitutions, alterations, and modifications which come within the scope of the appended claims or to which the present invention is readily susceptible without departing from the scope or spirit of this disclosure are considered a part of the present invention.

We claim:

1. A synergistic composition which simultaneously inhibits decay of citrus fruit by molds and fungi and prevents sporulation of said molds and fungi without adversely affecting the appearance and fitness for consumption of the fruit, said composition containing as active ingredients 2-(4-thiazolyl) benzimidazole and an alkali metal salt of orthophenyl pheonl tetrahydrate, the alkali metal being selected from the group consisting of sodium and potassium, the weight ratio of 2-(4-thiazolyl) benzimindazole to the alkali metal salt of ortho-phenyl phenol tetrahydrate, expressed as ortho-phenyl phenol, being 1:0.5–15.

2. A composition according to claim 1 wherein the composition is an aqueous composition and the alkali metal salt of ortho-phenyl phenol tetrahydrate is in solution.

3. A composition according to claim 2 wherein the amount of water preseen is from 60% to 90% by weight.

4. A composition according to claim 1 wherein the weight of 2-(4-thiazolyl) benzimidazole to the alkali metal salt of ortho-phenyl phenol tetrahydrate, expressed as ortho-phenyl phenol, 1:0.5–10.

5. A composition according to claim 1 wherein the weight ratio of 2-(4-thiazolyl) benzimidazole to the alkali metal salt of ortho-phenyl phenol tetrahydrate, expressed as ortho-phenyl phenol, is 1:1–10.

* * * * *